US009938434B2

(12) United States Patent
Doisneau

(10) Patent No.: US 9,938,434 B2
(45) Date of Patent: Apr. 10, 2018

(54) AQUEOUS ADHESIVE COMPOSITION FOR THE BONDING OF WOOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: David Doisneau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 432 days.

(21) Appl. No.: 14/763,375

(22) PCT Filed: Jan. 28, 2014

(86) PCT No.: PCT/EP2014/051608
§ 371 (c)(1),
(2) Date: Jul. 24, 2015

(87) PCT Pub. No.: WO2014/118163
PCT Pub. Date: Aug. 7, 2014

(65) Prior Publication Data
US 2016/0024353 A1    Jan. 28, 2016

(30) Foreign Application Priority Data

Jan. 29, 2013    (FR) ...................................... 13 50716

(51) Int. Cl.
| | | |
|---|---|---|
| C09J 161/06 | (2006.01) | |
| C08G 4/00 | (2006.01) | |
| C09D 161/12 | (2006.01) | |
| C09J 161/12 | (2006.01) | |
| B32B 7/12 | (2006.01) | |
| B32B 21/13 | (2006.01) | |
| B32B 37/12 | (2006.01) | |
| C09J 109/00 | (2006.01) | |

(52) U.S. Cl.
CPC ............... *C09J 161/06* (2013.01); *B32B 7/12* (2013.01); *B32B 21/13* (2013.01); *B32B 37/12* (2013.01); *C08G 4/00* (2013.01); *C09D 161/12* (2013.01); *C09J 109/00* (2013.01); *C09J 161/12* (2013.01); *C09J 2409/003* (2013.01)

(58) Field of Classification Search
CPC ...... C09J 161/04; C09J 161/06; C09J 161/12; C09J 161/14; C09J 161/16; C09J 2461/00; C09D 161/04; C09D 161/06; C09D 161/12; C09D 161/14; C09D 161/16; C08G 4/00
See application file for complete search history.

(56) References Cited

U.S. PATENT DOCUMENTS

| | | | |
|---|---|---|---|
| 2,360,376 A | 10/1944 | Van Epps | 20/89 |
| 2,414,414 A * | 1/1947 | Rhodes | C09J 161/12 156/335 |
| 2,561,215 A | 7/1951 | Mighton | 154/43 |
| 3,817,778 A | 6/1974 | Wright | 117/128.4 |
| 4,328,374 A * | 5/1982 | Yoshinaka | C07C 17/14 562/410 |
| 9,163,169 B2 * | 10/2015 | Balogh | C09J 161/12 |
| 2014/0235124 A1 | 8/2014 | Doisneau et al. | 442/149 |
| 2014/0235125 A1 | 8/2014 | Doisneau et al. | 442/149 |
| 2014/0308864 A1 | 10/2014 | Doisneau et al. | 442/149 |

FOREIGN PATENT DOCUMENTS

| | | | | |
|---|---|---|---|---|
| FR | 929407 | 12/1947 | | |
| WO | WO-2013057214 A1 * | 4/2013 | | C09J 131/04 |

OTHER PUBLICATIONS

International Search Report dated Aug. 1, 2014, issued by EPO in connection with International Application No. PCT/EP2014/051608.

* cited by examiner

*Primary Examiner* — Scott R Walshon
(74) *Attorney, Agent, or Firm* — Fitzpatrick, Cella, Harper & Scinto

(57) ABSTRACT

An aqueous adhesive composition comprises a phenol/aldehyde resin and less than 16% by weight of unsaturated diene elastomer latex. The phenol/aldehyde resin is based on an aromatic polyaldehyde bearing at least two aldehyde functional groups and comprising at least one aromatic nucleus, and on a polyphenol comprising one or more aromatic nuclei. If just one aromatic nucleus is present, the latter bears two or three hydroxyl functional groups in the meta position with respect to one another and the remainder of the aromatic nucleus is unsubstituted. If several aromatic nuclei are present, at least two of them each bear two or three hydroxyl functional groups in the meta position with respect to one another, it being understood that the two positions ortho to at least one of these hydroxyl functional groups are unsubstituted.

17 Claims, No Drawings

AQUEOUS ADHESIVE COMPOSITION FOR THE BONDING OF WOOD

FIELD OF THE INVENTION

The present invention relates to aqueous adhesive compositions intended to cause wood elements to adhere to one another, to the use and the process for the manufacture of such a composition, to the process for assembling the wood elements by means of these compositions and to the assemblages manufactured using these compositions.

RELATED ART

It has been known for a very long time to adhesively bond two wood elements to one another using an aqueous adhesive composition. Several types of compositions are known, including a composition of phenol/aldehyde type, as described in U.S. Pat. No. 2,360,376. This composition comprises a phenol/aldehyde resin based on formaldehyde and phenol. The molar ratio of formaldehyde to phenol is within a range of values extending from 2 to 3.5.

This composition is used in a process for the adhesive bonding of plywood articles comprising several wooden plies. During this process, one or more plies is/are coated with a layer of the composition, the plies are joined to one another via the layer of composition and the plies, thus joined, are baked under pressure. The adhesively-bonded assemblage thus obtained exhibits a high cohesion by virtue of the excellent adhesive properties of the composition.

However, the use of formaldehyde, furthermore in excess with respect to the phenol, results in the release of formaldehyde, not only during the baking under pressure but also during the storage and the use of the adhesively-bonded assemblage. In point of fact, due to the recent change in regulations, in particular in European regulations, with regard to this type of compound, it is desirable to limit as much as possible, indeed even to eliminate, the use of formaldehyde or formaldehyde precursor.

An aim of the invention is to provide an aqueous adhesive composition for the adhesive bonding of wood which exhibits elevated adhesive properties and which is devoid of formaldehyde.

In point of fact, during their research studies, the Applicant Companies have discovered an aqueous adhesive composition not using formaldehyde which makes it possible to achieve the above aim.

BRIEF DESCRIPTION OF EMBODIMENTS OF THE INVENTION

Thus, a first subject-matter of the invention relates to an aqueous adhesive composition comprising:
a phenol/aldehyde resin based:
on at least one aromatic polyaldehyde bearing at least two aldehyde functional groups and comprising at least one aromatic nucleus, and
on at least one polyphenol, comprising one or more aromatic nucleus/nuclei, it being understood that:
in the case of just one aromatic nucleus, the latter bears two or three hydroxyl functional groups in the meta position with respect to each other or with respect to one another, the remainder of the aromatic nucleus being unsubstituted,
in the case of several aromatic nuclei, at least two of them each bear two or three hydroxyl functional groups in the meta position with respect to each other or with respect to one another, it being understood that the two positions ortho to at least one of these hydroxyl functional groups are unsubstituted,
less than 16% by weight of unsaturated diene elastomer latex.

Another subject-matter of the invention relates to the use of an adhesive composition as described above for the adhesive bonding of two wood elements.

The invention also relates to a process for the manufacture of an aqueous adhesive composition as defined above in which the polyphenol and the aromatic polyaldehyde are mixed in an aqueous solution.

The invention also relates to a process for the adhesive bonding of two wood elements, in which:
a layer of the aqueous adhesive composition as defined above is applied to at least one of the two wood elements, and
the two wood elements are joined to one another via the layer of the aqueous adhesive composition.

The invention also relates to an adhesively-bonded assemblage of two wood elements comprising a layer of the aqueous adhesive composition as defined above joining the two wood elements to each another.

The invention and also its advantages will be easily understood in the light of the description and implementational examples which follow.

DETAILED DESCRIPTION OF THE INVENTION

I—Aqueous Adhesive Composition of the Invention

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should, of course, be understood as meaning a composition comprising the mixture and/or the reaction product of the various basic constituents used for this composition, it being possible for some of them to be intended to react or to be capable of reacting with one another or with their close chemical environment, at least in part, during the various phases of manufacture of the composition or the assembling, in particular during a baking stage, optionally under pressure.

I.1—Aromatic Polyaldehyde

The first essential constituent of the phenol/aldehyde resin is an aromatic polyaldehyde bearing at least two aldehyde functional groups and comprising at least one aromatic nucleus.

Preferably, the aromatic nucleus bears two aldehyde functional groups, it being possible for the latter to be in the ortho, meta or para position on the aromatic nucleus.

Advantageously, the aromatic nucleus of the aromatic polyaldehyde is a benzene nucleus.

Preferably, the aromatic polyaldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

Preferably, the aromatic polyaldehyde is selected from the group consisting of 1,3-benzenedicarboxaldehyde, 1,4-benzenedicarboxaldehyde and the mixtures of these compounds.

More preferably still, the aromatic polyaldehyde used is 1,4-benzenedicarboxaldehyde, also known as terephthaldehyde, to recall of expanded chemical formula:

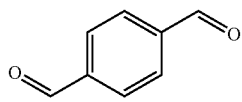

(I)

I.2—Polyphenol

The second essential constituent of the phenol/aldehyde resin is a polyphenol comprising one or more aromatic nucleus/nuclei.

In the case of a polyphenol comprising just one aromatic nucleus, the latter bears two or three hydroxyl functional groups in the meta position with respect to each other (in the case of two functional groups) or with respect to one another (in the case of three functional groups), the remainder of the aromatic nucleus being by definition unsubstituted; this is understood to mean that the other carbon atoms of the remainder of the aromatic nucleus (those other than the carbon atoms bearing hydroxyl functional groups) bear a simple hydrogen atom.

Preferably, in the case of a polyphenol comprising just one aromatic nucleus, the aromatic nucleus is a benzene nucleus.

Mention may in particular be made, as preferred example of polyphenol comprising just one aromatic nucleus, of resorcinol, to recall of expanded formula:

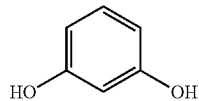

(II)

Mention may be made, as even more preferred example comprising just one aromatic nucleus, of phloroglucinol, to recall the expanded formula:

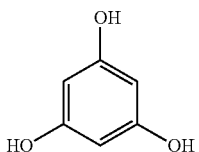

(III)

It should be noted that, in these two examples (II) and (III) of polyphenol, the aromatic nucleus is advantageously a benzene nucleus. In other embodiments, the aromatic nucleus is different from a benzene nucleus.

In the case of a polyphenol comprising several (two or more than two) aromatic nuclei, at least two of them each bear two or three hydroxyl functional groups in the meta position with respect to each other (in the case of two functional groups) or with respect to one another (in the case of three functional groups), it being understood that the two positions ortho to at least one of these hydroxyl functional groups are unsubstituted; this is understood to mean that the two carbon atoms located on either side (in the ortho position) of the hydroxylated carbon atom (i.e., bearing the hydroxyl functional group) bear a simple hydrogen atom.

Preferably, in the case of a polyphenol comprising several aromatic nuclei, each nucleus bearing two or three hydroxyl functional groups in the meta position with respect to each other or with respect to one another is a benzene nucleus.

As preferred examples, in the case where the polyphenol molecule comprises several aromatic nuclei, at least two of these aromatic nuclei, which are identical or different, are chosen from those of general formulae:

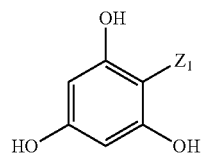

(IV-a)

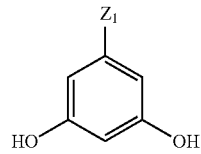

(IV-b)

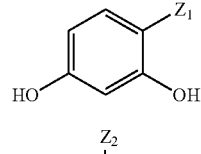

(IV-c)

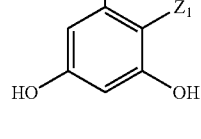

(IV-d)

in which the symbols $Z_1$ and $Z_2$, which are identical or different if there are several on the same aromatic nucleus, represent an atom (for example carbon, sulphur or oxygen) or a bonding group, by definition at least divalent, which connects at least these two aromatic nuclei to the remainder of the polyphenol molecule.

According to a specific and preferred embodiment of the invention, the polyphenol is, for example, a flavonoid, characterized to recall by a structure based on 15 carbon atoms, formed by two benzene rings connected by three carbon atoms. More particularly, the flavonoid used is 2',4',3, 5, 7-pentahydroxyflavone, also known as Morin, of formula (V) below:

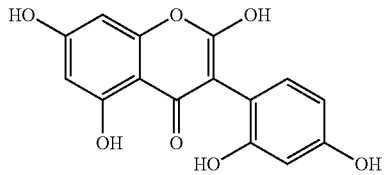

(V)

It is noted that this compound is a polyphenol comprising two aromatic nuclei (of respective formulae IV-c and IV-d above) each of which indeed bears two hydroxyl functional groups in the meta position with respect to each other, the two positions ortho to at least one of these two hydroxyl functional groups being unsubstituted.

According to another specific and preferred embodiment of the invention, the polyphenol is, for example, phloroglucide, also known as 2,4,6,3',5'-biphenylpentol, of the following expanded formula:

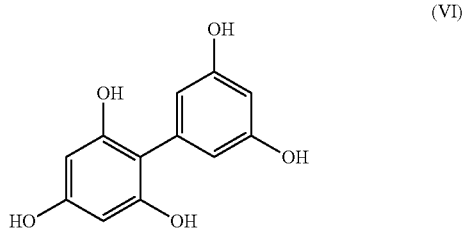 [SMILES: Oc1cc(O)cc(-c2c(O)cc(O)cc2O)c1]

(VI)

It is noted that this compound is a polyphenol comprising two aromatic nuclei (of respective formulae IV-a and IV-b above) each of which indeed bears at least two (in this case, one bears two and the other bears three) hydroxyl functional groups in the meta position with respect to each another, the two positions ortho to at least one of these two hydroxyl functional groups being unsubstituted.

According to yet another specific and preferred embodiment of the invention, the polyphenol is, for example, 2,2',4,4'-tetrahydroxydiphenyl sulphide of the following expanded formula:

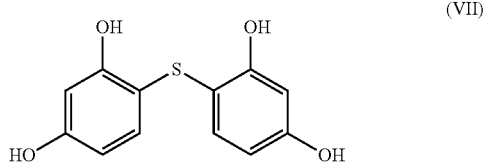 [SMILES: Oc1ccc(Sc2ccc(O)cc2O)c(O)c1]

(VII)

It should be noted that, in the examples (V), (VI) and (VII) which comprise several aromatic nuclei, each nucleus bearing two or three hydroxyl functional groups in the meta position with respect to each other or with respect to one another is a benzene nucleus. In other embodiments, the aromatic nucleus is different from a benzene nucleus.

In a preferred embodiment, the polyphenol is selected from the group consisting of phloroglucinol (III), 2,2',4,4'-tetrahydroxydiphenyl sulphide (VII) and the mixtures of these compounds.

I.3—Unsaturated Diene Elastomer Latex

The composition according to the invention comprises less than 16% (value excluded) by weight of unsaturated diene elastomer latex. Percentage by weight of the composition is understood to mean the percentage by weight of the total composition, that is to say weight of latex with regard to weight of the dry constituents plus weight of the water.

Preferably, the composition comprises at most 10%, preferably at most 5% and more preferably at most 1% by weight of unsaturated diene elastomer latex.

Unsaturated (that is to say, bearing carbon-carbon double bonds) diene elastomer latexes are well known to a person skilled in the art. It should be remembered that a latex is a stable dispersion of microparticles of elastomer(s) in suspension in an aqueous solution.

The unsaturated diene elastomer on the latex present in an amount of less than 16% by weight is preferably selected from the group consisting of polybutadienes, butadiene copolymers, polyisoprenes, isoprene copolymers and the mixtures of these elastomers. It is more preferably still selected from the group consisting of butadiene copolymers, vinylpyridine/styrene/butadiene terpolymers, natural rubber and the mixtures of these elastomers.

"Diene" elastomer (or without distinction rubber) is understood to mean an elastomer resulting at least in part (that is to say, a homopolymer or a copolymer) from diene monomer(s) (i.e., bearing two conjugated or nonconjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), the various copolymers of isoprene and the mixtures of these elastomers.

I.4—Additives

In one embodiment, the composition comprises at least one base. The base is, for example, ammonia, sodium hydroxide, potassium hydroxide or ammonium hydroxide.

The aqueous adhesive composition can, of course, comprise all or part of the usual additives for aqueous adhesive compositions. Mention will be made, for example, of colourants, fillers, antioxidants or other stabilizers.

II—Process for the Manufacture of the Aqueous Adhesive Composition of the Invention Typically, during a first manufacturing stage, an aqueous solution is prepared by gradually mixing water and a base. Preferably, the aqueous solution exhibits a pH ranging from 9 to 13, preferably from 10 to 12.

The polyphenol is then mixed with the aqueous solution. Subsequently, the aromatic polyaldehyde is added. The mixture thus formed is stirred for 1 to 30 min, for example 5 min, at 20° C.

In the embodiment in which the composition comprises one or more latexes of unsaturated diene elastomer(s) in a nonzero amount strictly less than 16%, the phenol/aldehyde resin, thus precondensed, is generally diluted in water before being added to the latex or to the latexes. In the embodiment in which the composition comprises a substantially zero amount of unsaturated diene elastomer latex, the aqueous adhesive composition is obtained directly.

The concentration of the composition can be adjusted as a function of its specific use (open time, viscosity). The composition can be used immediately or else stored for a maturing time which can typically vary from one to several hours, indeed even several days, before its final use.

III—Adhesively-Bonded Assemblage of the Invention

As indicated above, the present invention also relates to the use of the aqueous adhesive composition described above for the adhesive bonding of two wood elements.

Thus, an adhesively-bonded assemblage of two wood elements according to the invention comprises a layer of the aqueous adhesive composition as described above joining the two wood elements to one another.

Wood is understood to mean the plant tissue resulting from ligneous plants. Examples of plant tissue are the trunk, branches and roots. For example, the ligneous plants from which the plant tissue results are oak, chestnut, ash, walnut, beech, poplar, fir, pine, olive, alder or birch.

Element is understood to mean any monolithic piece or particle. Examples of elements are plies intended to form a plywood assemblage, lathwork intended to form a lathed assemblage, particles, such as chips, sawdust, flour or flakes, in order to form a chipboard assemblage, whether or not the particles are oriented, fibres intended to form an assemblage of fibres, such as a high- or medium-density panel, pieces of solid wood, also known as timber, intended to form assemblages, such as furniture or frames.

IV—Process for the Manufacture of the Adhesively-Bonded Assemblage of the Invention The adhesively-bonded assemblage of the invention can be prepared according to a process for the adhesive bonding of two wood elements in which:
  a layer of the aqueous adhesive composition as described above is applied to at least one of the two wood elements, and
  the two wood elements are joined to one another via the layer of the aqueous adhesive composition.

The stage of application of the adhesive composition to one of the or the wood elements can be carried out according to any appropriate method, in particular by any known coating technique, such as, for example, spraying, impregnation or injection under pressure or by a combination of one or more of these techniques.

Use may preferably be made of a content of aqueous adhesive composition ranging from 70 to 250 gr·m$^{-2}$.

After the stage of application of the adhesive composition, the adhesively-bonded assemblage is heated at a temperature ranging from 30° C. to 200° C., preferably from 80° C. to 160° C. according to the applications targeted.

Preferably, the adhesively-bonded assemblage is kept under pressure, for example under a pressure ranging up to 18 kg·cm$^{-2}$. More preferably the stage of keeping under pressure is carried out simultaneously with the heating stage.

The duration of the stage of heating and/or keeping under pressure varies from a few minutes to a few hours as the case may be, in particular according to the temperature/pressure pair used.

V—Examples of the Implementation of the Invention and Comparative Tests

These tests demonstrate that the adhesion between several wood elements joined via a layer of aqueous adhesive composition according to the invention is substantially equivalent, indeed even improved in some cases, in comparison with the adhesion obtained with a conventional adhesive composition using formaldehyde and phenol.

For this, several aqueous adhesive compositions were prepared as indicated above, several in accordance with the invention (denoted C-2 to C-6 hereinafter) and one not in accordance with the invention (control composition, denoted C-1 hereinafter). Their formulations (expressed by weight) are presented in the appended Table 1. The amounts listed in this table are those of the constituents in the dry state.

Composition C-1 is a control composition known from the state of the art commonly used for the adhesive bonding of wood. This adhesive composition is based on formaldehyde and phenol.

Each composition C-2 to C-6 comprises an aromatic polyaldehyde comprising at least one aromatic nucleus bearing at least two aldehyde functional groups. In the case in point, the aromatic nucleus is a benzene nucleus.

The aromatic polyaldehyde of compositions C-2 to C-6 is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

The aromatic polyaldehyde of compositions C-2 to C-5 is selected from the group consisting of 1,3-benzenedicarboxaldehyde, 1,4-benzenedicarboxaldehyde and the mixtures of these compounds.

The aromatic polyaldehyde of compositions C-2 to C-4 is 1,4-benzenedicarboxaldehyde. The aromatic polyaldehyde of composition C-5 is 1,3-benzenedicarboxaldehyde. The aromatic polyaldehyde of composition C-6 is 1,2-benzenedicarboxaldehyde.

Each composition C-2, C-4 and C-5 comprises a polyphenol comprising an aromatic nucleus bearing two or three hydroxyl functional groups in the meta position with respect to each other or with respect to one another, the remainder of the aromatic nucleus being unsubstituted. In the case in point, the aromatic nucleus is a benzene nucleus.

The polyphenol of each composition C-2 and C-5 is phloroglucinol. The polyphenol of composition C-4 is resorcinol.

Each composition C-3 and C-6 comprises a polyphenol comprising several aromatic nuclei, at least two among them each bearing two or three hydroxyl functional groups in the meta position with respect to each other or with respect to one another, it being understood that the two positions ortho to at least one of these hydroxyl functional groups are unsubstituted. In the case in point, each nucleus bearing two or three hydroxyl functional groups in the meta position with respect to each other or with respect to one another is a benzene nucleus.

The polyphenol of compositions C-3 and C-6 is 2,2',4,4'-tetrahydroxydiphenyl sulphide.

Each adhesive composition C-1 to C-6 furthermore comprises less than 16% (value excluded) by weight of unsaturated diene elastomer latex. Thus, each adhesive composition C-1 to C-6 comprises at most 10%, preferably at most 5% and more preferably at most 1% by weight of unsaturated diene elastomer latex. In this instance, the content by weight of unsaturated diene elastomer latex is substantially zero.

Each adhesive composition C-1 to C-6 comprises a base, in this instance sodium hydroxide.

The quality of the bonding between the wood elements is determined by a test in which the force necessary to separate two wood elements from one another by destruction of the layer joining the two elements is measured.

More specifically, each test specimen comprises two wood elements, in the case in point beech with a density equal to 0.83 g·cm$^{-3}$, each exhibiting a parallelepipedal general shape with dimensions of 70 cm×25 mm×3 mm. A layer of the aqueous adhesive composition is applied to each end of the elements over the entire width of the element, in this instance 25 min and over a length of 1 cm. The two elements are then joined via the layers of composition applied to each wood element. The total surface area of the test specimen formed by the two wood elements over which adhesive is spread is thus 5 cm$^2$. The composition of the test specimen thus formed is baked at 140° C. for three hours.

On conclusion of the baking, the test specimen thus composed of the two elements joined by adhesive bonding is inserted into the jaws of a tensile testing device and then drawn at a given rate and a given temperature (for example, the present case, at 10 mm/min and 20° C.).

The levels of adhesion are characterized by measuring the force, referred to as "pull-off strength" (denoted $F_{max}$) for separating the two elements from one another via a break in the adhesive bonding layer. A value greater than that of the control test specimen, arbitrarily fixed at 100, indicates an improved result, that is to say a greater pull-off strength than that of the control test specimen. The results of the tests carried out on the test specimens are summarized in Table 1.

It is found that the assemblages adhesively bonded with adhesive compositions C-2, C-3 and C-5 according to the invention exhibit a pull-off strength $F_{max}$ which is particularly high and unexpected for a person skilled in the art since it is very substantially increased (between 22% and 27%) in comparison with the reference pull-off strength measured on the control assemblage adhesively bonded with composition C-1. With regard to the assemblages adhesively bonded with compositions C-4 and C-6, they exhibit a pull-off strength $F_{max}$ which is admittedly lower than that of composition C-1 but entirely sufficient to provide effective adhesive bonding of the wood elements.

Unlike aliphatic polyaldehydes, the aromatic polyaldehyde of the composition remains stable as a result of the relative deactivation of the aromatic nucleus by the aldehyde functional groups. This relative deactivation of the aromatic nucleus is compensated for by the high reactivity of the polyphenol. This is because the two or three hydroxyl functional groups borne by the aromatic nucleus or nuclei of the polyphenol are positioned in the meta position with respect to each other or with respect to one another, which renders the polyphenol particularly reactive by double activation of the unsubstituted ortho positions.

In conclusion, the results of these various tests clearly demonstrate that the adhesive compositions according to the invention constitute an advantageous alternative to the use of the conventional adhesive compositions, this being the case without the use of formaldehyde.

TABLE 1

| | Adhesive compositions | | | | | |
|---|---|---|---|---|---|---|
| | C-1 | C-2 | C-3 | C-4 | C-5 | C-6 |
| Aldehyde | | | | | | |
| Formaldehyde (1) | 0.75 | — | — | — | — | — |
| 1,4-Benzene-dicarboxaldehyde (2) | — | 3.35 | 3.35 | 3.35 | — | — |
| 1,3-Benzene-dicarboxaldehyde (3) | — | — | — | — | 3.35 | — |
| 1,2-Benzene-dicarboxaldehyde (4) | — | — | — | — | — | 3.35 |
| Polyphenol | | | | | | |
| Phenol (5) | 4.7 | — | — | — | — | — |
| Resorcinol (6) | — | — | — | 5.5 | — | — |
| Phloroglucinol (7) | — | 6.3 | — | — | 6.3 | — |
| 2,2',4,4'-Tetrahydroxydiphenyl sulphide (8) | — | — | 11.7 | — | — | 11.7 |
| Base | | | | | | |
| Sodium hydroxide (9) | 1.5 | 1.5 | 1.5 | 2 | 2 | 2 |
| Total weight of solid content of adhesive composition | 14.6 | 14.6 | 14.6 | 14.6 | 14.6 | 14.6 |
| Weight of water | 5.4 | 5.4 | 5.4 | 5.4 | 5.4 | 5.4 |

TABLE 1-continued

| | Adhesive compositions | | | | | |
|---|---|---|---|---|---|---|
| | C-1 | C-2 | C-3 | C-4 | C-5 | C-6 |
| Adhesion tests | | | | | | |
| $F_{max}$ at 20° C. | 100 | 122 | 127 | 97 | 123 | 91 |

(1) Formaldehyde (from Caldic; diluted to 36%)
(2) 1,4-Benzenedicarboxaldehyde (from ABCR; of 98% purity)
(3) 1,3-Benzenedicarboxaldehyde (from ABCR; of 98% purity)
(4) 1,2-Benzenedicarboxaldehyde (from ABCR; of 98% purity)
(5) Phenol (from Aldrich, of 99% purity)
(6) Resorcinol (from Sumitomo; of 99.5% purity)
(7) Phloroglucinol (from Alfa Aesar; of 99% purity)
(8) 2,2',4,4'-Tetrahydroxydiphenyl sulphide (from Alfa Aesar; of 98% purity)
(9) Sodium hydroxide (from Aldrich; diluted to 30%)

The invention claimed is:

1. An aqueous adhesive composition comprising:
   a phenol/aldehyde resin based on:
      at least one aromatic polyaldehyde bearing at least two aldehyde functional groups and comprising at least one aromatic nucleus, and
      at least one polyphenol comprising one or more aromatic nuclei,
         wherein if only one aromatic nucleus is present, the only one aromatic nucleus bears two or three hydroxyl functional groups in the meta position with respect to one another and a remainder of the aromatic nucleus is unsubstituted, and
         wherein if more than one aromatic nuclei are present, at least two of the more than one aromatic nuclei each bear two or three hydroxyl functional groups in the meta position with respect to one another and the two positions ortho to at least one of the hydroxyl functional groups are unsubstituted; and
   less than 16% by weight of unsaturated diene elastomer latex.

2. The composition according to claim 1, wherein the composition contains at most 10% by weight of unsaturated diene elastomer latex.

3. The composition according to claim 2, wherein the composition contains at most 5% by weight of unsaturated diene elastomer latex.

4. The composition according to claim 3, wherein the composition contains at most 1% by weight of unsaturated diene elastomer latex.

5. The composition according to claim 1, wherein the aromatic nucleus of the at least one aromatic polyaldehyde bears two aldehyde functional groups.

6. The composition according to claim 1, wherein the aromatic nucleus of the at least one aromatic polyaldehyde is a benzene nucleus.

7. The composition according to claim 1, wherein the at least one aromatic polyaldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and mixtures thereof.

8. The composition according to claim 7, wherein the at least one aromatic polyaldehyde is selected from the group consisting of 1,3-benzenedicarboxaldehyde, 1,4-benzenedicarboxaldehyde and mixtures thereof.

9. The composition according to claim 8, wherein the at least one aromatic polyaldehyde is 1,4-benzenedicarboxaldehyde.

10. The composition according to claim 1, wherein, if only one aromatic nucleus is present in the at least one polyphenol, the only one aromatic nucleus is a benzene nucleus.

11. The composition according to claim 1, wherein, if more than one aromatic nuclei are present in the at least one polyphenol, each nucleus bearing two or three hydroxyl functional groups in the meta position with respect to one another is a benzene nucleus.

12. The composition according to claim 1, wherein the at least one polyphenol is selected from the group consisting of phloroglucinol, 2,2',4,4'-tetrahydroxydiphenyl sulphide and mixtures thereof.

13. A process for the manufacture of an aqueous adhesive composition according to claim 1 comprising the step of mixing the at least one polyphenol and the at least one aromatic polyaldehyde in an aqueous solution.

14. The process according to claim 13, wherein the aqueous solution has a pH ranging from 9 to 13.

15. The process according to claim 14, wherein the aqueous solution has a pH ranging from 10 to 12.

16. A process for the adhesive bonding of two wood elements comprising the steps of:
   applying a layer of the aqueous adhesive composition according to claim 1 to at least one of the two wood elements; and
   joining the two wood elements to one another via the layer of the aqueous adhesive composition.

17. An adhesively-bonded assemblage of two wood elements comprising a layer of the aqueous adhesive composition according to claim 1 joining the two wood elements to each other.

* * * * *